Patented Apr. 19, 1932

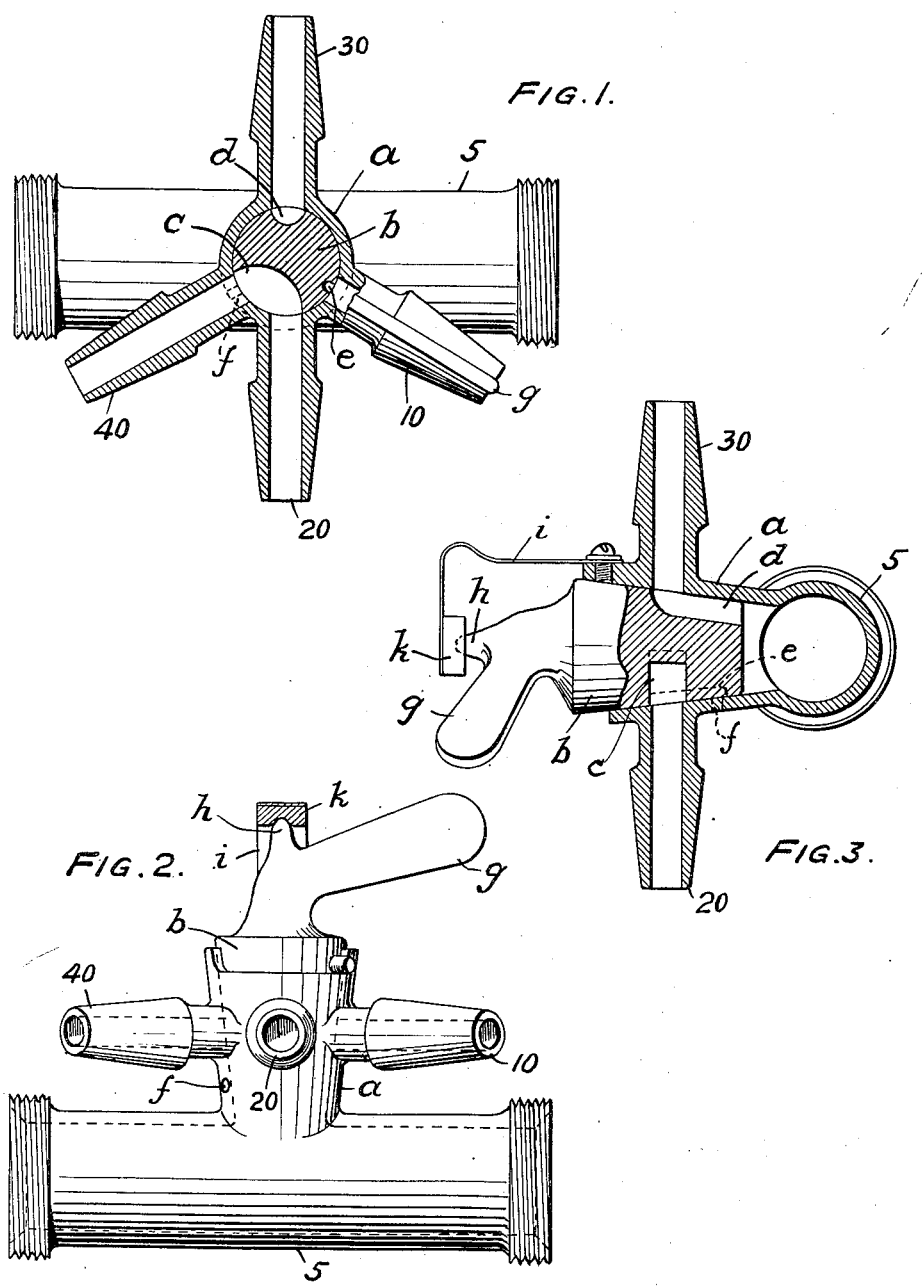

1,854,307

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

VALVE

Application filed November 25, 1929. Serial No. 409,439.

In an application for patent filed by me February 2, 1929, Serial No. 336,998, there is set forth a milking machine comprising teat cups, a milk and vacuum pipe line, a milk pail, a milk pipe from the teat cups, a milk and air pipe to the pail top, an air pipe to the pail top, and a milk pipe to the pail bottom; all of these pipes leading to a common point at which a master valve is positioned. The valve is movable into three positions. In one position, the valve connects the air pipe with the milk and vacuum line and establishes connection between the first named milk pipe and the milk and air pipe, thereby creating a vacuum in the top of the pail and causing milk to flow from the teat cups to the pail. In another position, the valve connects the milk and air pipe with the atmosphere and connects the last named milk pipe with the milk and vacuum line, thereby causing milk to be forced from the pail into the vacuum line. In a third or neutral intermediate position of the valve all these connections are closed. The control of the various ports and passages above mentioned and the establishment of various connections between them by means of a single master valve involves a substantial simplification both of construction and operation. It is, however, difficult to provide such a valve which will not be open to objections from the standpoint, not of operativeness, but of high mechanical efficiency.

The object of the present invention is to increase the efficiency and durability of the valve. My improved valve is of minimum length, which is a feature of some importance. The likelihood of leakage is reduced to a minimum if not entirely eliminated and provision is made for insuring a complete seating of the valve in any position, which is a factor of importance in plug valves.

In the drawings, which show a preferred embodiment of the invention—

Fig. 1 is a view showing the valve in cross-section and nozzles, radiating therefrom, in longitudinal section, the milk and vacuum pipe being shown in elevation.

Fig. 2 is an elevational view of the structure shown in Fig. 1.

Fig. 3 is another sectional view showing the valve and two of said nozzles in longitudinal section and the milk and vacuum pipe in cross-section; the valve being in the same operative position as in Fig. 1.

On the milk and vacuum pipe line 5 is mounted a frusto-conical valve chamber $a$ in open communication with said pipe. Radiating from the valve chamber are four nozzles 10, 20, 30 and 40.

Nozzle 10 connects with a pipe (not shown) which connects with the bottom of a milk pail (not shown). Nozzle 20 connects with a pipe (not shown) which connects, directly or indirectly, with the milk chambers of teat cups (not shown). Nozzle 30 connects with a pipe (not shown) which connects with the upper part of the milk pail. Nozzle 40 connects with a pipe (not shown) which also connects with the top of the milk pail.

In the valve chamber $a$ is seated a plug valve $b$ which is provided with three channels, namely, an arcuate port $c$, an air passage $d$, and an air passage $e$. The valve chamber $a$ is provided with an atmospheric port $f$.

When the valve $b$ is turned, by means of the handle $g$, into the position shown in the figures, port $d$ connects the milk and vacuum pipe 5 with nozzle 30, which establishes a vacuum in the pail, and port $c$ connects nozzles 20 and 40, which causes milk to flow from the test cups through nozzle 20, port $c$ and nozzle 40 and thence to the pail.

When the valve $b$ is turned into a second position, that is, through an arc of about 120° in a clockwise direction from the position shown in Fig. 1, passage $e$ is brought into position to register with atmospheric port $f$ and connect the latter with nozzle 40, which admits air to the top of the pail; while passage $d$ registers with nozzle 10, thereby causing milk to flow from the bottom of the pail into the milk and vacuum line 5. Port $c$ registers with nozzle 30, but is functionless, since in that position it establishes no other connection.

When the valve is turned into an intermediate position, none of the ports and passages establishes any operative connection. This intermediate position is, in actual operation, a neutral position between the other two operative positions.

While, in order to illustrate a useful embodiment of the invention, the valve structure is shown as one used in milking operations in order to direct the milk from teat cups into a pail and then discharge it into a pipe line communicating with a delivery reservoir (not shown), the structure may be found useful in other applications.

In order to hold the valve sufficiently tightly in its seat to prevent leakage while permitting turning and also to permit the valve to be readily removed for cleaning and to be readily replaced, the following construction has been devised. On the outer end of the valve b is an axial projection h. Secured to the valve casing a is one end of a bent leaf spring i carrying at its free end a head k having a recess in which the projection h is seated. The tension of the spring is effective to hold the valve in its seat, but the free end of the leaf spring may be displaced to allow the valve to be withdrawn.

In the construction shown the nozzles 10, 20, 30 and 40 are all in circumferential alignment, thereby permitting the plug valve to be of the desired minimum length. Leakage is avoided and the valve may be readily removed and replaced.

In claiming the positioning of the axes of the four pipes in approximately the same plane. I mean to include such close approximation to the same plane as will enable the employment of the described short valve.

Having now fully described my invention, what I claim and desire to protect by Letters Patent is:

1. A master valve structure for controlling the flow therethrough of milk and air, which comprises a valve casing having an air inlet port, a milk and vacuum pipe line opening into said valve casing, and four pipes radiating from the valve casing, one an air pipe, another an air and milk pipe, and the other two milk pipes, and a plug valve seated in the casing: said valve having a passage adapted, in one position of the valve, to connect said air pipe with the milk and vacuum pipe and having another passage adapted, in the same position, to connect the air and milk pipe with one of the milk pipes; said valve having a third passage adapted, in another position of the valve, to connect the air inlet port with the air and milk pipe; the first named passage adapted, in the latter named position of the valve, to connect the other milk pipe with the milk and vacuum pipe line.

2. A valve structure in accordance with claim 1 in which one end of the valve casing opens into the milk and vacuum pipe line and in which the first named passage opens into the same end of the valve casing.

3. A valve structure in accordance with claim 1 in which the said four pipes extend radially from the axis of the valve with their axes in approximately the same plane.

4. A valve structure in accordance with claim 1 in which one end of the valve casing opens into the milk and vacuum pipe line and in which the said four pipes extend radially from the axis of the valve with their axes in approximately the same plane.

5. A valve structure comprising a milk and vacuum pipe line, a valve casing one of whose ends opens into said pipe line, a turnable plug valve in the valve casing, and four pipes radiating from the valve casing; the valve having a passage adapted in two different positions of the valve to respectively connect two different radiating pipes with the milk and vacuum pipe line and in each of said positions to disconnect therefrom the other of said two radiating pipes, said valve having another passage adapted in one of said positions to establish connection between the third and fourth pipes, said valve being adapted, in the other of said two positions, to close each of the said third and fourth pipes from communication with said pipe line and the other three pipes.

6. A valve structure in accordance with claim 5 in which the axes of the said four pipes are in approximately the same plane.

7. A valve structure comprising a milk and vacuum pipe line, a valve casing one of whose ends opens into said pipe line, a turnable plug valve in the valve casing, and four pipes radiating from the valve casing; the valve having a passage adapted in two different positions of the valve to respectively connect two different radiating pipes with the milk and vacuum pipe line, said valve having another passage adapted in one of said positions to establish connection between the third and fourth pipes, said valve being adapted, in the other of said two positions, to close each of the said third and fourth pipes from communication with said pipe line and the other three pipes, and a passage adapted in the last named position to connect one of the third and fourth pipes with a source of fluid pressure.

In testimony of which invention, I have hereunto set my hand at New York city, New York, on this 18th day of November, 1929.

CYRUS HOWARD HAPGOOD.